United States Patent [19]
Wells

[11] Patent Number: 4,504,055
[45] Date of Patent: Mar. 12, 1985

[54] ELECTRONIC VIDEO GAME APPARATUS ADAPTED FOR USE TO PLAY A SIMULATED GAME OF GOLF

[76] Inventor: Charles D. Wells, "Glaed Hame", Pasture Rd., Letchworth, Hertfordshire, England

[21] Appl. No.: 456,728

[22] Filed: Jan. 10, 1983

[30] Foreign Application Priority Data

Jan. 13, 1982 [GB] United Kingdom ............... 8200917

[51] Int. Cl.³ ............................................. A63B 69/36
[52] U.S. Cl. ............................... 273/85 G; 273/87 R; 273/DIG. 28
[58] Field of Search ................. 273/85 G, 185 B, 237, 273/87 R, 176 A; 340/323 R

[56] References Cited

U.S. PATENT DOCUMENTS

| | | | |
|---|---|---|---|
| 4,086,630 | 4/1978 | Speiser et al. | 273/185 B X |
| 4,108,442 | 8/1978 | Bynam | 273/237 |
| 4,343,469 | 8/1982 | Kunita et al. | 273/85 G X |
| 4,383,056 | 8/1981 | Miller | 273/176 A |
| 4,419,655 | 12/1983 | May | 340/323 R |

FOREIGN PATENT DOCUMENTS 2005549 4/1979 United Kingdom.
2049439 12/1980 United Kingdom.

Primary Examiner—William H. Grieb
Attorney, Agent, or Firm—Herbert L. Boettcher

[57] ABSTRACT

A video golf machine enables players to play simulated golf against each other. The machine presents a picture or plan of each "hole" of a selected golf course, including the length of the hole, slope (19) of the ground, positions of boundaries and of obstacles such as trees (17), shrubs, bunkers (13) and water (15) for example. For each game conditions may change such as wind direction (20) and strength, temperature, humidity, surface condition, condition of each green and any other variable affecting all players alike. Each player selects type of club and strength and direction of shot for each shot.

18 Claims, 10 Drawing Figures

ELECTRONIC VIDEO GAME APPARATUS ADAPTED FOR USE TO PLAY A SIMULATED GAME OF GOLF

FIELD OF THE INVENTION

This invention relates to an electronic apparatus of a type adapted for use to play a simulated game or sport, preferably for use by at least two persons to play the simulated game of golf against each other.

BACKGROUND OF THE INVENTION

In real life, an outdoor game of golf is subject to variable conditions of play, including weather conditions and the condition of the course or ground. For example, the travel of a given golf ball, as a result of a given strength of shot with a given golf club in a given direction from a given spot on a given golf course, will vary with the wind speed, wind direction, condition of the course (for example course wet or dry, grass long or short) and even the ambient temperature and humidity.

The variable conditions of play to which the outdoor game of golf is subject in real life have, to some extent, been taken into account in prior art golf game simulation apparatus. Thus, for example, British Pat. No. 2 005 549, published on Apr. 25, 1979, discloses a golf ball trajectory presentation system, in which a player drives a real golf ball from a tee with a real club toward a real screen. A golf fairway scene is projected (optically) on the screen. Electro-optical sensors monitor the initial (real) flight of the ball and are cabled to a launch monitor which calculates initial flight conditions which are connected to a trajectory calculator. The flight trajectory is converted to values of elevation and deflection angles as would be seen by the golfer. A ball projector projects a spot representing the ball and, after the ball impacts the screen, moves the projected spot smoothly along an apparent arc until the ball contacts the ground, bounces and rolls before coming to rest. An "exerciser console" is suggested to enable application of environmental and other variables to the flight, bounce and roll of the ball, such as humidity, temperature, atmospheric pressure, wind, ground softness and terrain slope, and to add or subtract hazards.

Related prior art includes U.S. Pat. No. 4,343,469, issued on Aug. 10, 1982 to Y. Kunita et al., which discloses a golf game practicing apparatus capable of representing real putting shots on a simulated putting green. Also of interest in U.S. Pat. No. 4,283,056, issued on Aug. 11, 1981 to F. C. Miller, which discloses a process for a simulated game of golf utilizing a conventional golf practice driving range in which a player uses a real golf club to strike a real ball on a golf practice driving range. There is shown on a screen a representation of part of a golf course illustrating where the ball would have gone on the golf course. And, in respect of the use of a game simulation apparatus by at least two players, reference may be had to British Pat. No. 2 049 439, published on Dec. 31, 1980, in which there is disclosed an apparatus for playing a game involving movement on a miniature playing field of a real projectile under the control of an audience of players.

SUMMARY OF THE INVENTION

According to the invention there is provided an electronic video game apparatus adapted for use to play a simulated game of golf, comprising video display means programmed to visually present a display of the game of golf, showing features of a golf course and showing successive positions of an imaginary golf ball on the course during the game, the apparatus being variably programmable by first means to simulate different weather conditions and/or different course conditions, the apparatus also comprising second means selectively operable by a player to simulate choices of imaginary golf club and of strengths and directions of imaginary shots, the apparatus being adapted to plot the successive positions of the golf ball in dependence upon the particular weather conditions and/or course conditions being simulated and in dependence upon the particular choices of imaginary golf club and of strengths and directions of imaginary shots, as well as in dependence upon the features of the golf course.

Preferably said first means is selectively operable to set particular chosen conditions or to select conditions at random; a memory stores a plurality of different sets of conditions selectable by said first means; and said first means is adapted for varying at least one simulated condition of: wind direction; wind speed; temperature; humidity; dryness/dampness of ground.

Additionally, in a preferred embodiment of the invention said first means is selectively operable to select different golf courses; a memory stores the topography of each said course, including the locations and positions of greens and of features in the form of obstacles such as bunkers, water, trees and bushes and of boundaries and slopes; a given golf course can be selected for more than one game; at least one such golf course is a representation of a particular real-life golf course as regards its topography; said first means is adapted for varying a simulated condition of a "fairway" and/or of "rough ground" and/or of a "green" of the golf course, such as to vary the effect on a given "ball" of a given "shot"; said first means is adapted for varying the following simulated condition, namely whether the game is to be single, foursomes, threeball, fourball, or greensome; and said second means is selectively operable by each player for that player to simulate choice of ball.

DESCRIPTION OF PREFERRED EMBODIMENTS

General

Figure 1:
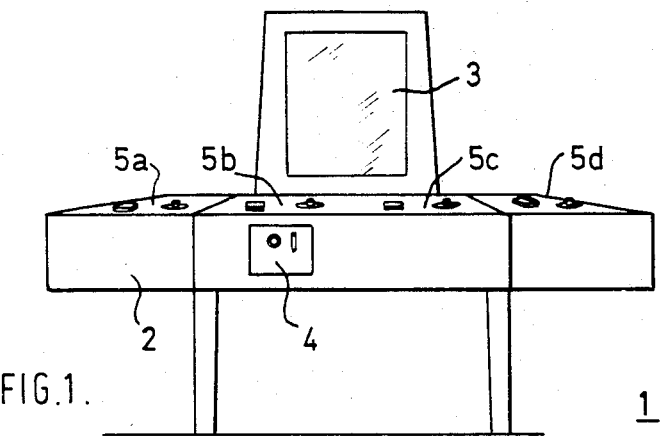
FIGS. 1, 2 and 3 are respectively a front elevation, a plan view and a side elevation of an electronic apparatus embodying the invention.
Figure 2:
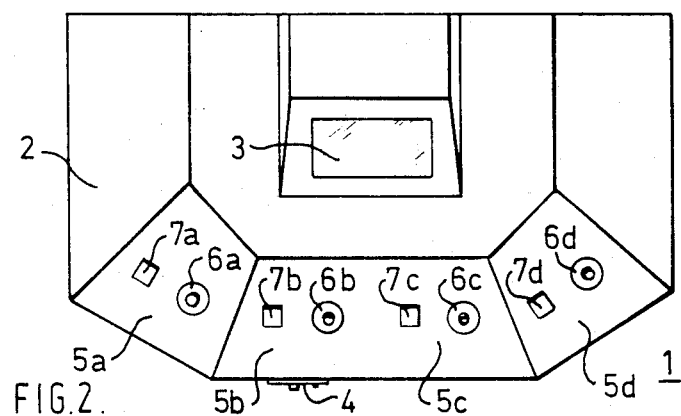
Figure 3:
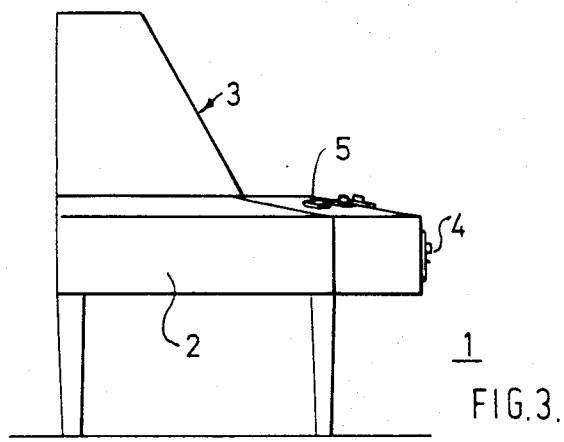

Referring to FIGS. 1, 2 and 3, the illustrated electronic apparatus 1 comprises a console 2 with a video screen 3, the latter being a conventional colour cathode ray tube ("c.r.t.") screen. The console 2 also has a coin slot arrangement 4 and four sets of controls 5a to 5d for four respective players "A" to "D". Each set of controls 5 comprises a rotary selector knob 6 (a to d) and a "selection agreed" pushbutton 7 (a to d)—although each set of controls 5 does not necessarily have to be in this form, they may for example be remote from the console but connected to it by cables, not shown. The console 2 houses a specially developed microprocessor or computer (FIG. 6) with extensive memory capability and specially developed software (described hereinafter).

The electronic apparatus 1 is specially adapted for playing video golf, that is, a video game closely based on the real game of golf. The said video game can be played by selectively two, three or four players, preferably real golf players or real golf spectators having an appreciation of the factors involved in playing real golf. The apparatus provides for a choice of "courses", that is to say, video representations of real golf courses, preferably well-known real championship courses. The apparatus also provides for a choice of conditions, including in particular weather conditions, affecting all players alike. Naturally, the apparatus allows each player to choose for himself how that player plays a particular game of video golf, including choice of "clubs", choice of direction to hit the "ball" and choice of strength of shot.

All instructions, options, directions etc. are displayed on the screen 3 from the computer software, described hereinafter.

Each player has only the controls 5 mentioned above, namely, the rotatable selector knob 6 to move a screen cursor to a desired option, and the "selection agreed" button 7, which also acts as a "play" button.

TO PLAY A GAME

To begin a game, the required coinage is inserted into the coin slot 4. The computer then displays six items in turn on screen 3 as preliminaries prior to play, as follows:

| PRELIMINARIES PRIOR TO PLAY | |
|---|---|
| Item | Description |
| 1. Course Selection: | Choice of ten championship courses. |
| 2. Game Selection: | Single or foursomes; Threeball; Fourball; Greensome. |
| 3. Predetermined or Random Weather Selection: | Wind direction - 8 points of compass; Wind strength - 8 grades in mph; Temperature - 3 grades; Humidity - 3 grades. |
| 4. Predetermined or Random Surface Condition: | Dry (plenty of bounce and run on the ball); Moist (not too much bounce and run); Wet (heavy ground, little bounce or run). |
| 5. Predetermined or Randon "Condition of Greens" selection | Fast, medium pace or slow. |
| 6. Choice of ball. Each player then chooses his/her ball | Large or small; Three grades (with respect to distance travelled). |

Items Nos. 1 to 5 (and particularly items Nos. 3 to 5) of the preliminaries prior to play, namely, selections of course, game, weather, surface condition and conditions of greens, affect all players alike. That is to say, all of the players in a given game benefit (or, as the case may be, suffer) from the same conditions or weather, surface condition and condition of greens, as well as playing the same game on the same course. Accordingly, only one of the sets of controls 5 is required to make these selections, namely, the controls 5b, which are adjacent coin slot 4 (although any other set of control sets 5a to 5d would serve equally well). The sixth item, choice of ball, is an individual one for each player. Preferably the players decide amongst themselves the initial order of play and then take up positions accordingly, the first to "tee off" (player "A") at controls 5a, the second (player "B") at controls 5b, the third ("C") at 5c and the fourth ("D") at 5d.

For each selection, the computer displays the possible choices on screen 3, together with a movable cursor or pointer (displayed on the screen) and designates the control to be operated to make the required selection. Designation of control may be by instruction on the screen or by illumination of the appropriate control 5 (i.e. 5a, 5b, 5c, and 5d) for example, illumination of the appropriate one of the four knobs 6a to 6d and/or its associated pushbutton 7a–d. To make the selection, the appropriate knob 6 is rotated to move the cursor or pointer, displayed on the screen, to the required choice, also displayed on the screen, and then the associated button 7 is operated to signify the agreed choice.

THE ACTUAL GAME

Figure 4:
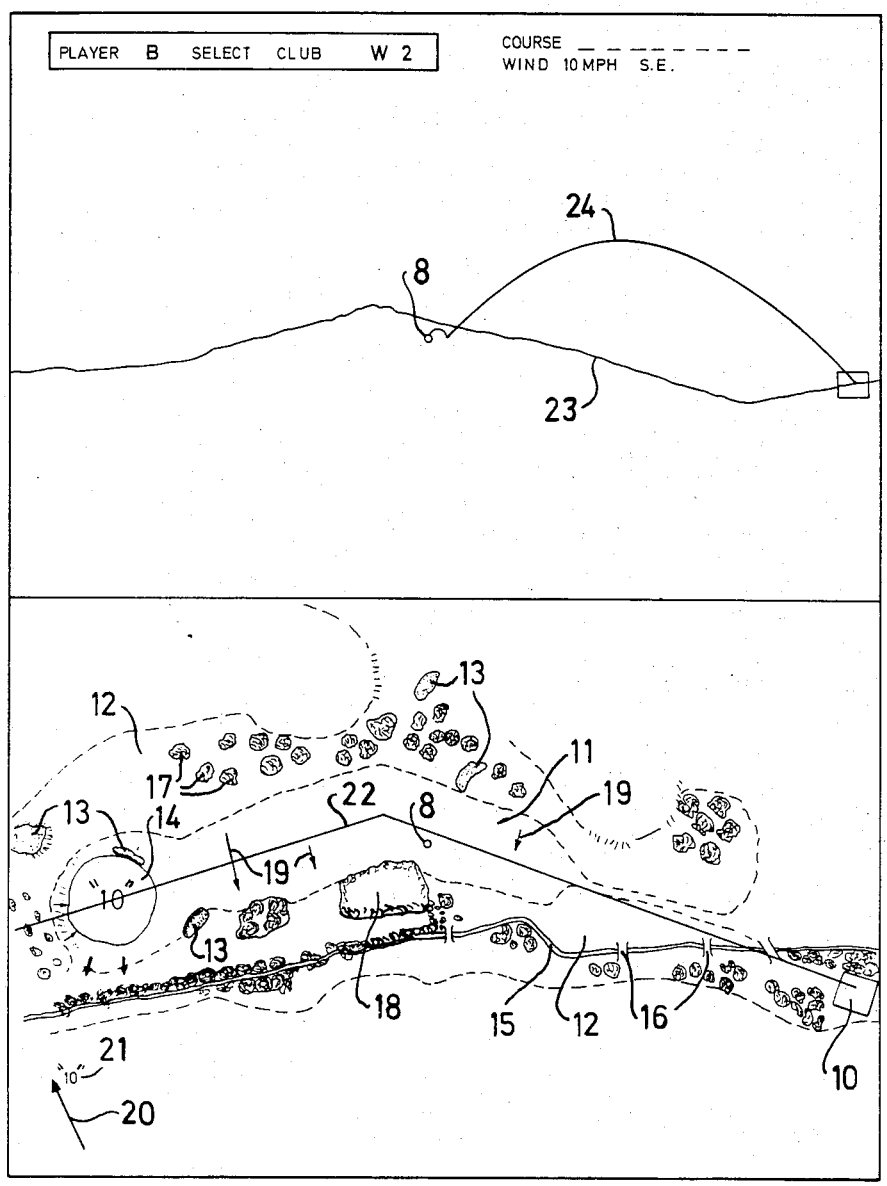
FIG. 4 illustrates a typical two-part illustration which might appear on a screen of the apparatus of FIGS. 1 to 3, in "shot play" during the course of a game.

After the selections have been made relating to the preliminaries prior to play, the actual game is ready to start and the screen 3 automatically shows, from the computer software, a two-part illustration of the first hole such, for example, as shown in FIG. 4, which happens to show hole No. 10 of a particular golf course. (By "hole" is meant the part of the golf course including, and in the vicinity of, the "tee", the associated "green" (with the hole proper) and the route (not always straight) from the tee to the associated green.) The colours used are as follows:

| | |
|---|---|
| Very light green with different shades through to | greens apron fairway and tees light rough medium rough heavy rough |
| Very dark green | very heavy rough |
| Light brown | bunkers |
| Light brown/green | trees |
| Dark brown | footpaths and hard ground |
| Yellow line | "out of bounds" line |
| Blue | water. |

With regard to the view of the hole on the screen 3 (see FIG. 4, lower half), there is a choice of 256 combinations of colour and intensity (brightness). The lower half of FIG. 4 shows the tee 10, fairway 11, rough 12, bunkers 13, green 14 (showing the No. of the hole), water 15 and bridges 16 plus individual trees 17 and a copse or wood 18. The ground slope is shown by arrows 19, the length of the slope is indicated by the length of the arrow shaft and the severity of the slope by the thickness or brightness of the arrow. Colour change is not to be confused with brightness—they are different.

Wind speed and direction are as shown by an arrow 20 (bottom left) and the wind speed as miles per hour in numbers 21.

Bunkers may be shallow or may have a steep facing slope which would be indicated by a darker shade of brown on the steep slope. This would have a minimum club type of penalty to get out.

The upper half of FIG. 4 is a side elevation with respect to the centreline of the hole as shown by the bent line 22 down the middle of the hole. The line 23 in the upper half of FIG. 4 is a line showing the elevation of the line 22 down the middle of the hole in the lower half of FIG. 4.

The following course data is displayed:
(i) Hole length in meters or yards, par and stroke index
(ii) 50 meter or 50 yard markers.
(iii) Wind direction
(iv) Wind strength in mph
(v) Ground slope direction by arrows 19 (always downwards).
(vi) Ground slope angle—by thickness or brightness of direction arrows 19.

SHOT PLAY

Since the first person to "tee off" is player "A", his controls 5a are designated (see above) and his ball appears on the screen. (Eventually, when there are two or more balls shown on the screen, which is when two or more players have "teed off" which for any given hole, the ball "in play" is distinguished from the others, preferably, by being made brighter.)

When any player's turn comes round for him to play, whether teeing off or otherwise, the player uses his control unit 5 to make a series of choices one after another.

For each shot the player has to make the following decisions from his own separate control unit:
Choice of club: fourteen clubs including the putter
Strength of shot: from strength "1", a full shot to strength "8", a minimum weight shot e.g. a chip onto the green from the apron with a "7" iron.
Direction of shot: by means of a pointer on the video adjusted from each individual player's control unit 5.

The player may, if he/she so wishes, keep these decisions secret from the other players, where possible.

The apparatus preferably includes means enabling a player to choose to play at different standards, for example, beginner, average club player or professional standard, with corresponding variations in the accuracy and/or distance of travel of the ball. As to the variables affecting all shots from tee to green, the standard reference for the average club player might, under the following conditions:

no wind; ball on fairway; moist surface; medium temperature; medium humidity; flat fairway; full shot; medium grade, small ball; be as follows:

| | |
|---|---|
| Driver | 235 yards |
| "3" wood | 215 yards |
| "4" wood | 205 yards |
| "2" iron | 192 yards |
| "3" iron | 180 yards |
| "4" iron | 168 yards |
| "5" iron | 155 yards |
| "6" iron | 143 yards |
| "7" iron | 130 yards |
| "8" iron | 118 yards |
| "9" iron | 107 yards |
| Wedge | 98 yards |
| Sand iron | 75 yards. |

On a medium pace, flat green (always using the putter) the standard reference for the average club player with the same ball might be 18 feet (ie 6 yards) for a shot strength 5.

As mentioned above, the respective player's (for example, player A's) control knob 6 is illuminated to indicate that his action is required. At the same time his ball is given extra brightness if need be to distinguish it from the others. Simultaneously in a box on top of the screen "CLUB CHOICE 1-14 0" is displayed. The player then rotates his control knob 6 until the appropriate number or letter and number appears; for example, woods are numbered W1-4, irons 3-9, wedge W, sand wedge S and putter P.

The choice having been made, he then presses the button 7 and the next choice appears, "SHOT STRENGTH 1-8, 0". Selection is made in the same way as for club choice and then the next choice appears, "DIRECTION" and immediately behind the ball a white circle with an arrow inside it appears. Rotation of the control knob will rotate the arrow to the desired shot direction; player A then presses the SELECT/PLAY button 7 and the ball follows a trajectory determined by the fixed factors and the selected variables. The ball lands, bounces and comes to a halt. The process is then repeated for the remaining players in turn.

With the exception of play on the green, all the variables previously selected or taken by random choice affect the length, the trajectory, the run on landing, the change of direction in flight and on the ground.

Apart from the foregoing, a shot will be penalised on length if the wrong club is chosen eg a full shot with a 2 iron from the heavy rough may only make 20 yards, whereas a 7 iron (a better choice) may make 150 yards.

A ball 8 striking or landing in a tree will drop to the bottom of the tree and will require to be chipped out with a maximum strength 5 shot.

A ball 8 landing in bushes, a hedge or water, will require a drop of two club lengths distance for a one stroke penalty.

A ball 8 landing out of bounds will require to be replaced for the usual stroke and distance penalty.

A shot played from a bunker will also be affected by the weather conditions selected ie dry, moist or wet.

The position of the ball 8, start, flight and finish including bounces are shown with respect to deviation to the centreline in elevation—an example is shown in the upper half of FIG. 4, line 24.

Shot play (as distinct from "Gree Play"—see below) is continued until all balls are on the green 14.

PLAY ON THE GREENS

Figure 5:
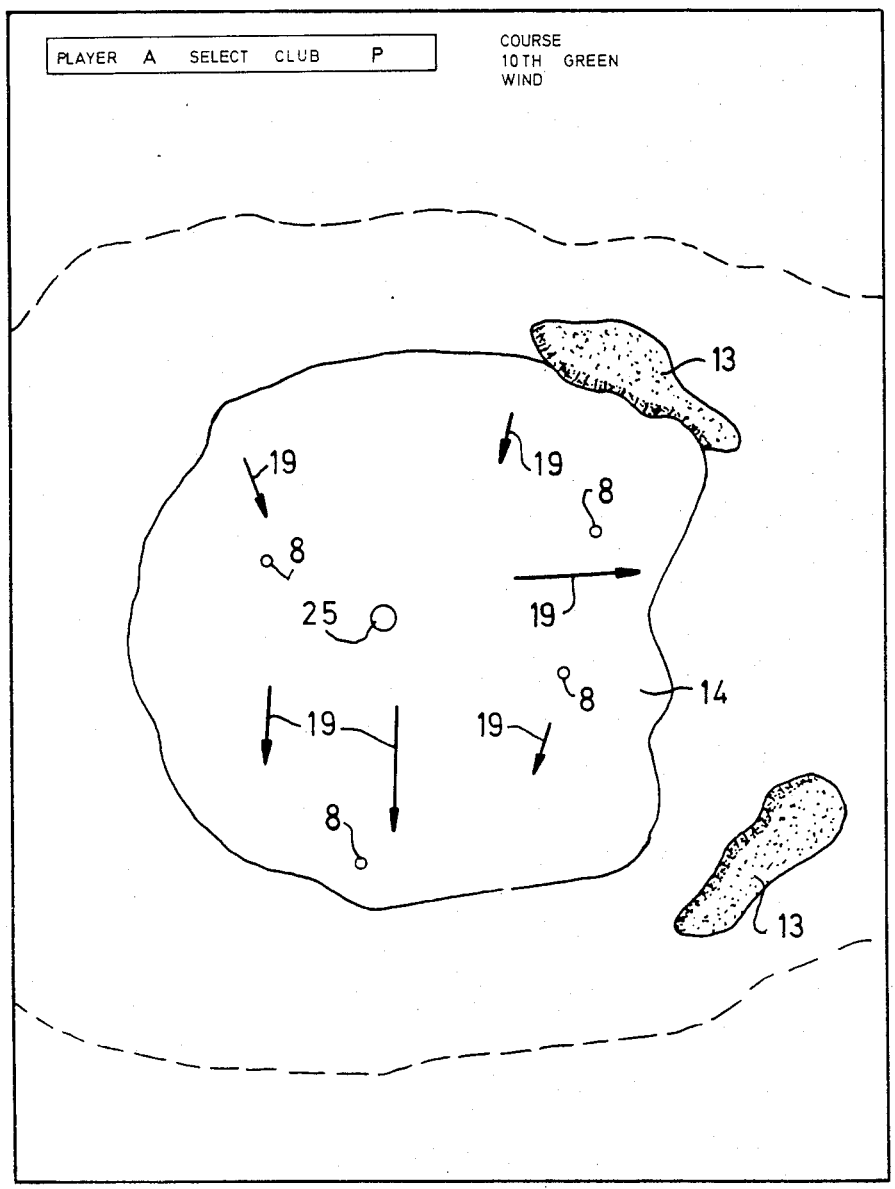
FIG. 5 illustrates a typical illustration which might appear on the screen of the apparatus of FIGS. 1 to 3 in "green play" during the course of a game.

When all balls 8 are on the green only the full green area is displayed, as in FIG. 5. No side elevation is required because the ball 8 stays on the ground. Arrows 19 as before are used to indicate the length and severity of the slope as shown in FIG. 5.

The pace of the greens has already been determined at the beginning of the game. The slope and direction of each slope are displayed on the video screen by arrows 19. It remains for each player only to decide:
Strength of putt from 1-10
Direction of putt
Play putt button (button 7).

For the ball 8 to go in the hole (proper) 25, it has not only to hit the hole 25 but must also be travelling slow enough to drop. If it is travelling too fast it will go beyond the hole 25.

A facility may be provided for players to signify "Hole Complete" at any stage of the game eg when the hole has been won, for the next hole to be displayed.

The game may be played for a full 18 holes and continued with another course provided that further coins are put in.

COMPUTER HARDWARE

Figure 6:
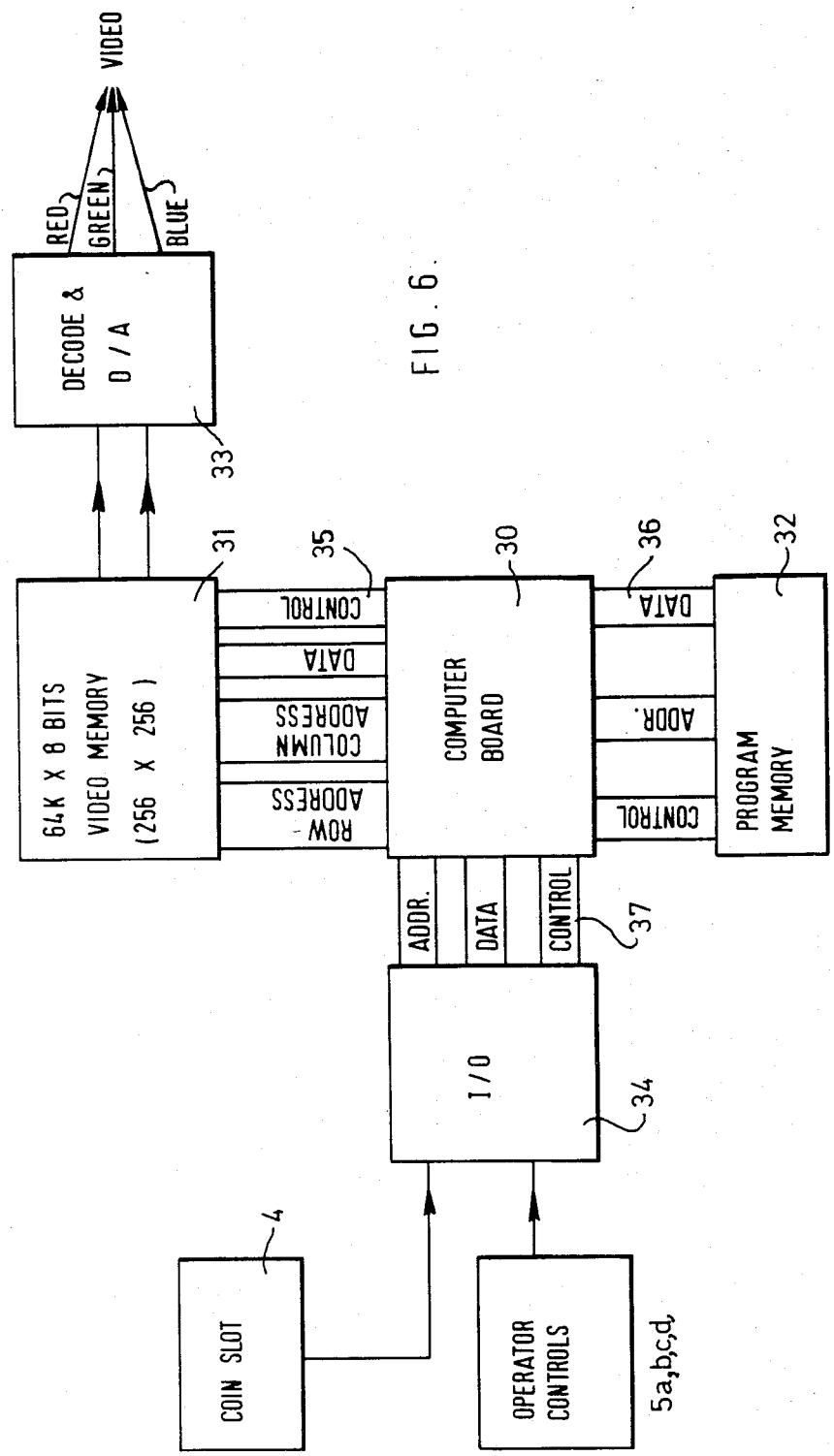
FIG. 6 is a block schematic of computer hardware in the apparatus of FIGS. 1 to 3.

Referring to FIG. 6, the computer comprises a computer board 30, a video memory 31, a program memory 32, a decoder and digital-to-analogue converter 33 and input/output interface unit 34. The video memory 31 is connected to the computer board 30 by row address, column address, data and control buses 35. The program memory 32 is connected to the computer board 30 by control, address and data buses 36. The video memory 31 is connected to the decoder and digital-to-analogue converter 33, from which the "VIDEO RGB" (red-green-blue) signals are transmitted to the screen 3, FIGS. 1-3. The coin slot arrangement 4 and operator controls 5a, 5b, 5c and 5d are connected to the input/output interface unit 34, which is connected to the computer board 30 by address, data and control buses 37.

The video memory 31 has a capacity of 64K bytes or greater, where 1 byte equals 8 bits.

The video memory 31 is connected to the computer board 30 as a normal computer memory and data can be read from and written to the video memory 31 by the computer board 30 in the normal way.

Memory locations are designated to represent physical locations on the CRT screen. The computer board 30 regards the video memory 31 as a two dimensional array of X and Y coordinates as rows and columns.

The cycle time of the video memory 31 is faster than the cycle time of the computer. The extra time available to the video memory 31 is used to output data for the video display. The video data is output automatically, one byte at a time, at a rate suitably synchronised with a standard television monitor.

One byte of memory is used to represent one point on the screen display. The byte of data is decoded to produce the variations of colour and brightness of the display. One byte of data can represent 256 different combinations of brightness and colour.

Thus an uninterrupted display is produced which the computer can examine, modify or update at high speed.

For example after a "ball" has been "struck" its position on the screen is updated every 10 m Sec. Before the ball is displayed at a new position the display at the new position is examined to see if a tree has been struck.

The central processor board 30 consists of a 16 bit microprocessor and dedicated numeric data processor chip. A small amount of random access memory is included for temporary data storage.

The program memory 32 is contained in eproms. It is in two separate parts. The first part consists of the general software to control the game, to compute the path of the ball and to generate video pictures.

The second part contains the data necessary to generate the picture of a particular hole of a particular course. This part of the software of a machine will typically contain five championship courses. These can be changed from time to time to maintain interest.

The input/output interfaces unit 34 comprises conventional circuits for connecting the coin slot 4 and player controls 5 into the computer.

COMPUTER SOFTWARE

When no game is being played a background is generated to create interest in the machine.

Figure 7:
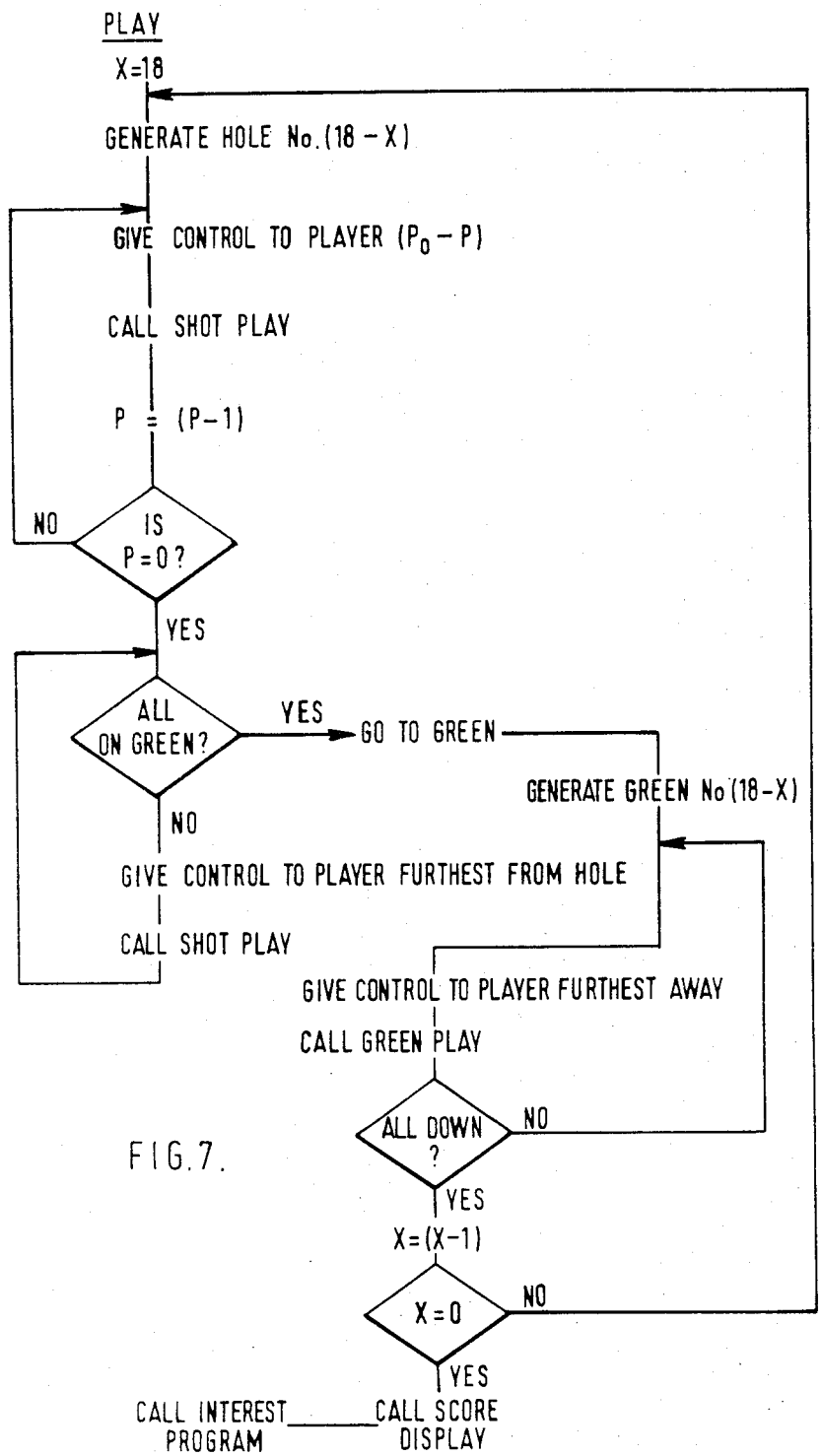
FIG. 7 is a "truth diagram" or sequence or flow diagram illustrating successive steps or routines in a game, two of the steps being "shot play"
Figure 8:
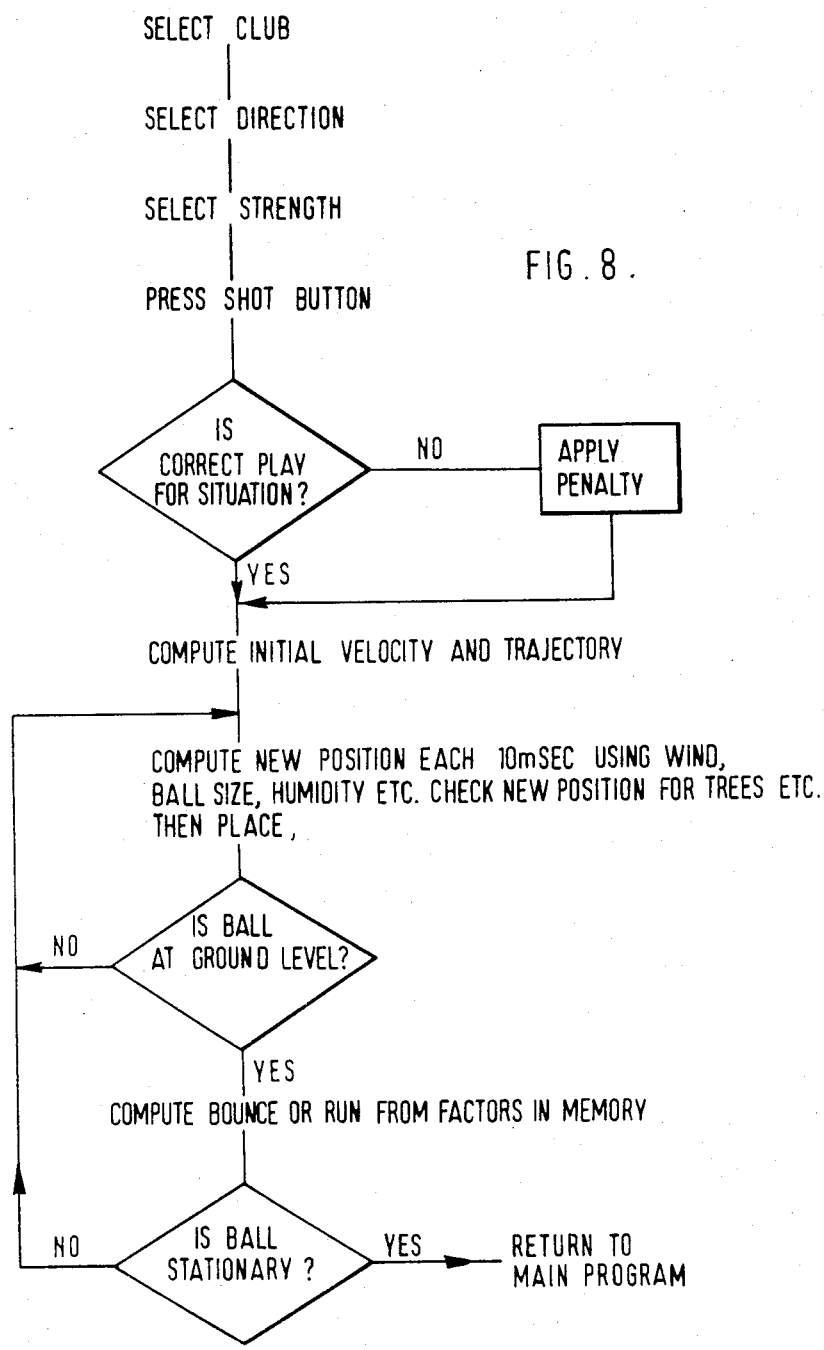
FIG. 8 is a "truth diagram" or sequence or flow diagram illustrating successive sub-steps or sub-routines in the "shot play" of FIG. 7.

When a game is being played, the computer presents the various series of choices and stores selections made. FIG. 7 is a truth diagram, or sequence or flow diagram, illustrating the logic of the computer during play. FIG. 8 is similar to FIG. 7 but specifically concerns "shot play", which occurs twice in FIG. 7. "Green play" differs from "shot play" principally in that the putter is always used and the ball is assumed to run along the ground and not be affected by the wind.

The details of various holes and courses are stored in program memory. The data is compressed for efficient storage.

The compression is done in two ways. Firstly common picture elements such as trees of various types, or bunkers are only stored once. Different programs for different courses then use these common elements in different parts of the screen.

Secondly objects can be made up of geometrical shapes such as squares, elipses and triangles. Only the minimum data to define the shape and its position need then be stored. The computer can generate the data to store in the screen memory to make a solid object at run time. A randomising function is introduced to break up the hard geometrical outlines. Similarily a randomising function is applied to the shade of colour, within a band and the brightness to produce a more natural textured appearance.

To produce a display the computer first initialises the screen memory to a background colour. The course details are then added one element at a time.

The total time to complete the picture should be no more than 1 second or so.

The slope of ground, wind strength etc are displayed on course.

Each player takes shots as for normal golf rules. For each shot each player selects club and strength and direction of shot, as explained above.

After each shot is played the computer uses the stored parameters about ground and weather conditions together with shot details (club type and strength and direction of shot) to compute the track of the ball. The computations occur every 10 milliseconds (msecs) until the ball comes to rest. The computation is explained below in more detail.

The position the shot is played from is used to assess the choice of club etc. A bad selection is penalised on distance.

If the position of the ball coincides with a tree or other feature (both in plan and elevation, since a ball can pass over a tree) a change of direction is imparted to the ball.

When the ball reaches ground level the computer decides whether the ball will bounce or run depending on ground conditions, velocity and angle of impact.

When all the players have managed to get their balls onto the green, the computer changes the display to the large scale view of the green, as discussed above.

Following normal golf rules the players take turns at green shots.

A different subroutine called green play is used for strokes on the green.

Again the computer updates the position of the ball every 10 msecs until the ball enters the hole or comes to rest.

The velocity of the ball is checked when its position is at the hole. If is is going too fast it will not enter the hole proper but may be deflected, and run on.

A careless stroke may cause the ball to leave the green and a special routine handles this situation.

When all the balls have been put into the hole the computer proceeds to display the next hole of the course.

After the completion of the last hole the results of the game are displayed.

The computer then returns to generating backgrounds to generate interest in machine.

COMPUTATION OF THE TRACK OF THE BALL

Figure 9:
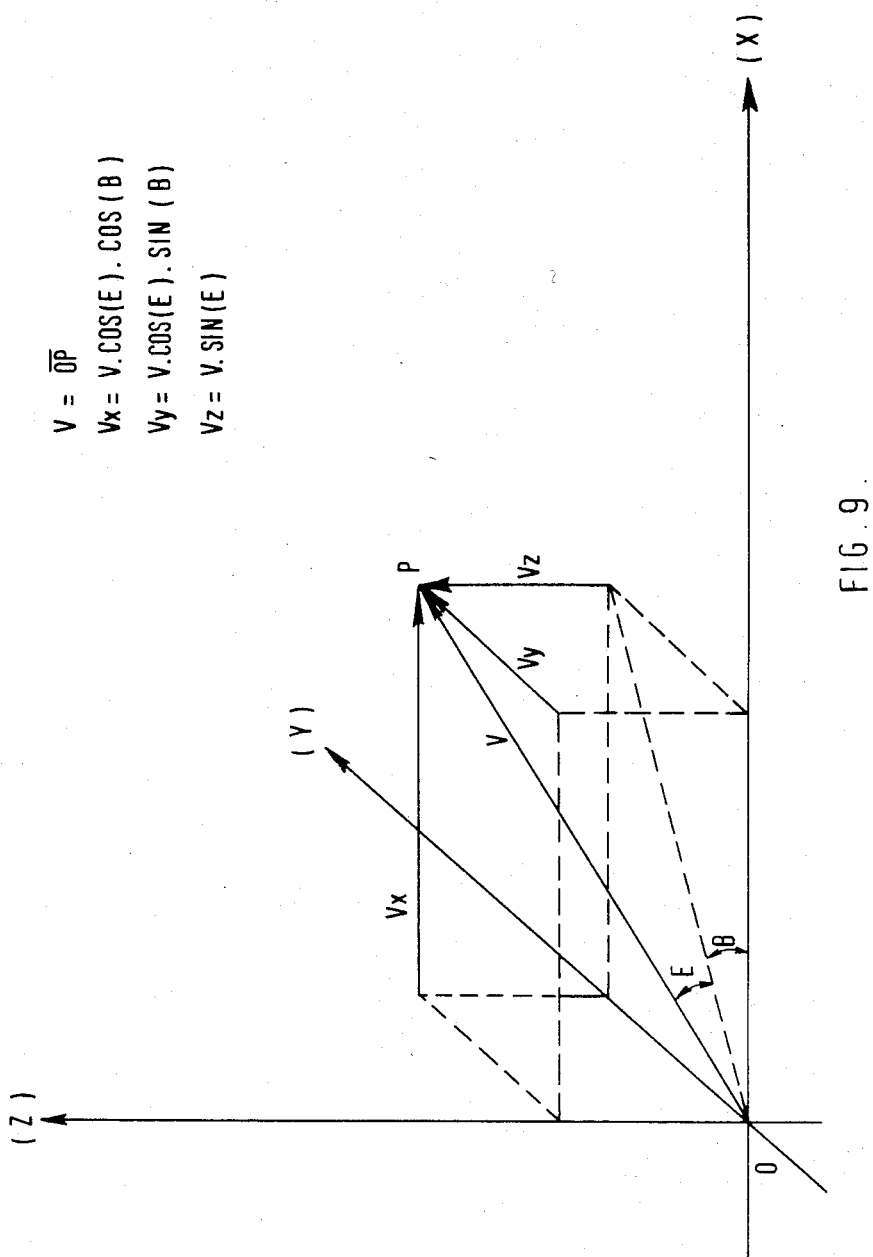
FIG. 9 is a three-dimensional vector diagram illustrating computation of "ball velocity"
Figure 10:
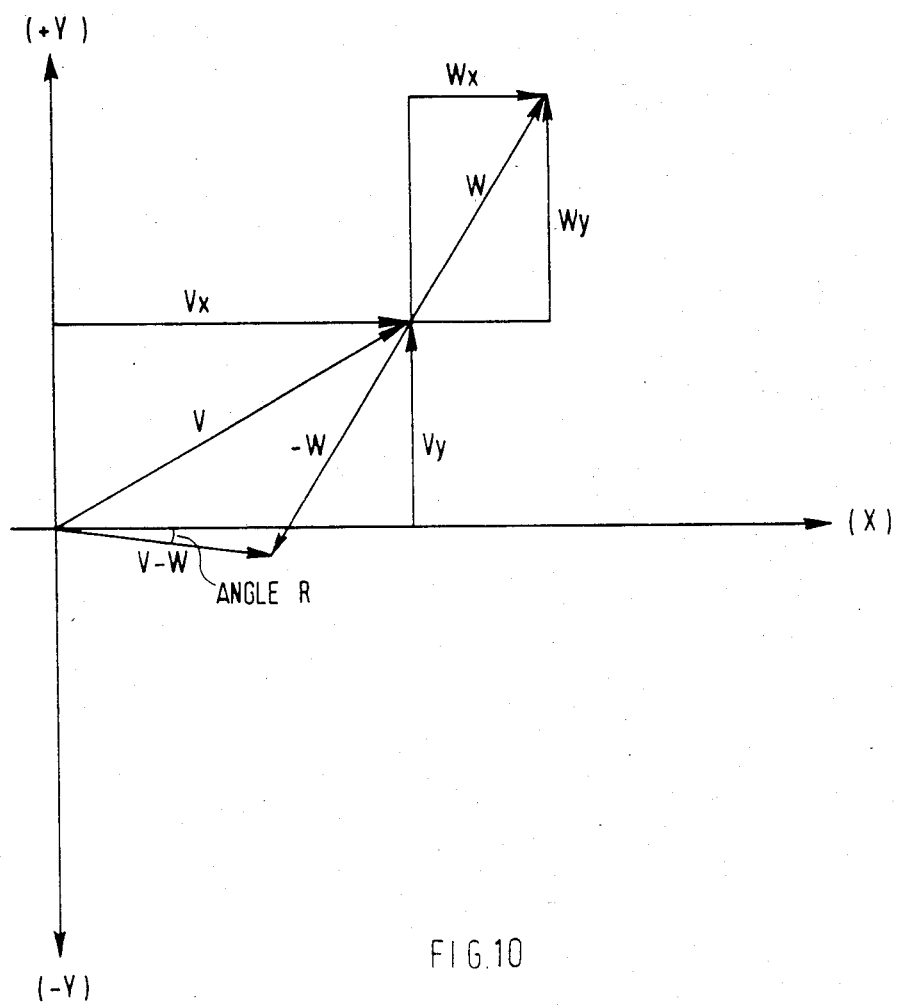
FIG. 10 is a two-dimensional vector diagram illustrating the effect of "wind velocity" on "ball velocity".

Referring to FIGS. 9 and 10, at the start of the calculation of the track of the ball the three components of the velocity of the ball $V_x$, $V_y$ and $V_z$ and the components of the wind velocity $W_x$ and $W_y$ are computed.

If B=Angle of Bearing
and E=Angle of Elevation then $$V_x = V \cdot \cos(E) \cdot \cos(B)$$

$$V_y = V \cdot \cos(E) \cdot \sin(B)$$

$$V_z = V \cdot \sin(E) \text{ (SEE FIG. 9)}$$

Also if Bw is the angle of the wind then $$W_x = W \cdot \cos(Bw)$$

$$W_y = W \cdot \sin(Bw)$$

When the ball is struck $$x = 0$$
$$y = 0$$
$$z = 0$$

To simplify the calculation we neglect the vertical component of the velocity in the drag calculations. Then the velocity of the ball relative to the air:

$$V_R = \sqrt{(V_x - W_x)^2 + (V_y - W_y)^2}$$

The angle of the ball's motion relative to the air:

$$R = \sin^{-1}(V_y - W_y)/V_R$$

IF
$\rho$ = Air Density
d = Diameter of Ball
V = Velocity of Ball
K = Coefficient of Drag
Then Drag $D = \rho \cdot d^{1.2} \cdot V^2 \cdot K$.
In time element $\delta t$ change in velocity of ball $$\delta V_R = (\delta t \cdot D)/M$$

(from force = M dv/dt)

Where M = Mass of Ball
from which $$\delta V_x = \delta V \cdot \cos(R)$$

$$\delta V_y = \delta V \cdot \sin(R)$$

IF g = Acceleration due to gravity
then $$\delta V_z = g \cdot \delta t$$

$$T_z = g \cdot \delta t$$

Therefore at the end of time $\delta t$ the new components of the ball's velicity are:

$$V_x^1 = V_x - \delta V_x$$

$$V_y^1 = V_y - \delta V_y$$

$$V_z^1 = V_z - \delta V_z$$

From which the new position of the ball is:

$$X^1 = X + V_x \cdot \delta t$$

$$Y^1 = Y + V_y \cdot \delta t$$

$$Z^1 = Z + V_z \cdot \delta t$$

I claim:

1. An electronic video game apparatus adapted for use to play a simulated game of golf, comprising video display means programmed to visually present a display of the game of golf, showing features of a golf course and showing successive positions of an imaginary golf ball on the course during the game, the apparatus being variably programmable by first means to simulate different weather conditions and/or different course conditions, the apparatus also comprising second means selectively operable by a player to simulate choices of imaginary golf club and of strengths and directions of imaginary slots, the apparatus being adapted to plot said successive positions of the golf ball in dependence upon the particular weather conditions and/or course conditions being simulated and in dependence upon the particular choices of imaginary golf club and of strengths and directions of imaginary shots, as well as in dependence upon said features of the golf course.

2. An apparatus as claimed in claim 1 wherein said first means is selectively operable to set particular chosen conditions or to select conditions at random.

3. An apparatus as claimed in claim 1 or 2 wherein a memory stores a plurality of different sets of conditions selectable by said first means.

4. An apparatus as claimed in claim 1 or 2 wherein said first means is adapted for varying at least one simulated condition of:
wind direction; wind speed, temperature; humidity; dryness/dampness of ground.

5. An apparatus as claimed in claim 1 or 2 wherein said first means is selectively operable to select different golf courses.

6. An apparatus as claimed in claim 5 wherein a memory stores the topography of each said course, including the locations and positions of greens and of features in the form of obstacles such as bunkers, water, trees and bushes and of boundaries and slopes.

7. An apparatus as claimed in claim 6 wherein a given golf course can be selected for more than one game.

8. An apparatus as claimed in claim 7 wherein at least one such golf course is a representation of a particular real-life golf course as regards its topography.

9. An apparatus as claimed in claim 1 or 2 wherein said first means is adapted for varying a simulated condition of a "fairway" and/or of "rough ground" and/or of a "green" of the golf course, such as to vary the effect on a given "ball" of a given "shot".

10. An apparatus as claimed in claim 1 or 2 wherein said first means is adapted for varying the following simulated condition, namely whether game is to be single, foursomes, threeball, fourball, or greensome.

11. An apparatus as claimed in claim 1 or 2 wherein said second means is selectively operable by each player for that player to simulate choice of ball.

12. An apparatus as claimed in claim 1 or 2 wherein the apparatus is adapted to permit choice of "clubs" during "shot play" but only a "putter" for "green play".

13. An apparatus as claimed in claim 12 wherein the apparatus is adapted to be able to calculate the trajectory of the imaginary ball flying through the air during "shot play" but to predetermine that the ball remains on the ground during "green play".

14. An apparatus as claimed in claim 1 or 2 wherein the apparatus is adapted to calculate the trajectory of a "struck" "ball" from instant to instant until the "ball" comes to rest.

15. An apparatus as claimed in claim 1 or 2 wherein the apparatus is adapted to "call shot play" until all player's balls are "on the green" of a particular "hole" in a particular game.

16. An apparatus as claimed in claim 1 or 2 wherein the apparatus is adapted to present a visual representation of the topography of one "hole" at a time, including the locations and plan views of the green, boundaries, bunkers, water and fairway and the locations of the tee and trees and the directions of slopes.

17. An apparatus as claimed in claim 16 wherein the apparatus is adapted to change to a larger scale view of the green alone for "green play".

18. An apparatus as claimed in claim 1 or 2 wherein the apparatus is adapted to provide a visual representation of a ball flying through the air after being struck by a "club" other than a "putter".

* * * * *